March 21, 1939. C. B. JANDOS 2,151,552
ELECTRODE HOLDER
Filed Oct. 16, 1937
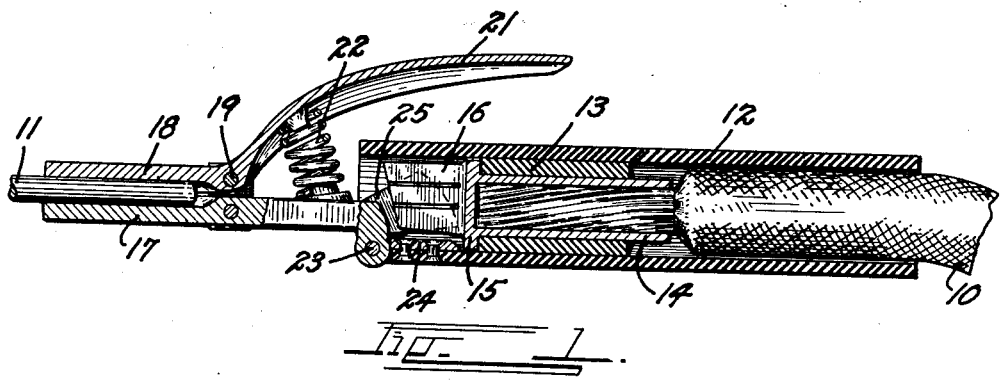
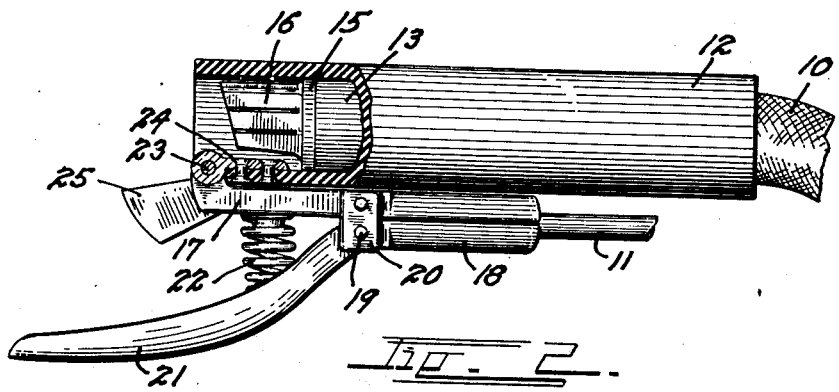
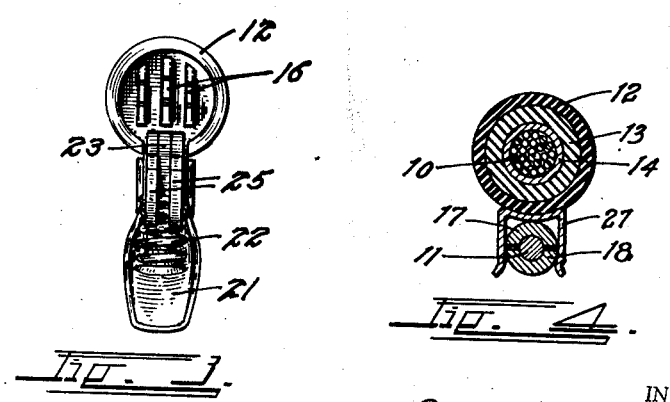
INVENTOR.
CHARLES B. JANDOS.
BY
ATTORNEY.

Patented Mar. 21, 1939

2,151,552

UNITED STATES PATENT OFFICE 2,151,552

ELECTRODE HOLDER

Charles B. Jandos, Craig, Colo.

Application October 16, 1937, Serial No. 169,352

3 Claims. (Cl. 219—8)

This invention relates to an electrode holder for electric welders. It often is necessary for a welder to lay the electrode holder and electrode down while rearranging his work, etc. If the holder or electrode accidentally contacts grounded metals, they will arc, burning the electrode holder and electrode and causing not only damage to the contacted materials but also flashes which are very injurious to unprotected eyes. To avoid this, it is necessary to carefully place the electrode on insulated surfaces or shut off the current supply thereto.

The principal object of this invention is to combine, with an electrode holder, means for easily and quickly disconnecting the holder and electrode from the current supply when it is not in use to prevent accidental contacts.

Another object is to provide an electrode holder in which the jaws can be easily, cheaply and quickly removed and replaced, without requiring replacement of the entire holder, should they become burned, worn or corroded from use.

Other objects and advantages reside in the detail construction of the invention, which is designed for simplicity, efficiency, and economy. These will become more apparent from the following description.

In the following detailed description of the invention reference is had to the accompanying drawing which forms a part hereof. Like numerals refer to like parts in all views of the drawing and throughout the description.

In the drawing:

Fig. 1 is a longitudinal section through the improved electrode holder in the welding position.

Fig. 2 is a side view thereof partially broken away in the "out-of-service" position.

Fig. 3 is an end view of the electrode holder in the position of Fig. 2.

Fig. 4 is a cross section through the handle portion of the electrode holder with the electrode gripping portion of the device folded thereon. This view illustrates a clamping device which may be used to hold the gripping portion against the handle.

In the drawing a typical welding cable is indicated at 10 with a welding electrode at 11.

The improved holder comprises a handle formed from a tube 12 of hard rubber, fiber, Bakelite, or other electrical insulating material. Within the tube 12 is an insulating bushing 13 supporting a terminal sleeve 14, into which the extremity of the cable 10 is soldered or otherwise secured.

The sleeve 14 terminates at its forward extremity in a switch plate 15 from the face of which a plurality of stationary parallel switch blades 16 project.

The electrode gripping portion of the device consists of a hinged jaw member 17 and a clamping jaw member 18, between which the electrode 11 is held. The clamping jaw member is mounted upon a hinge pin 19 in a clip 20 secured to the jaw member 17 and terminates at its rearward extremity in a finger grip 21. A compression spring 22 constantly urges the two jaw members against the electrode 11. The hinged jaw member 17 is mounted upon a hinge pin 23 carried in a hinge pad 24 which is riveted or otherwise secured to the tube 12.

A series of swinging switch blades 25 project from the jaw member 17 at an angle which will enable them to pass between the stationary blades 16, when in the position of Fig. 1, and swing away from the blades 16 when in the position of Fig. 2.

It can be readily seen that when in use with the jaws in the extended position of Fig. 1, an uninterrupted supply of current is fed from the cable 10 to the electrode 11. When not in use, the jaws are folded back along the handle to the position of Fig. 2 so that the circuit between the cable 10 and the electrode is completely broken at the blades 16 and 25 so that accidental electric contacts with the metal portions of the holder are impossible.

It is preferred to slot the stationary blades 16 as illustrated to increase their flexibility and increase their area of contact with the blades 25.

If desired, a spring clip 27, such as shown in Fig. 4, may be carried by the handle 12 for engaging and holding the jaws in the "off" position.

While a specific form of the improvement has been described and illustrated herein, it is desired to be understood that the same may be varied, within the scope of the appended claims, without departing from the spirit of the invention.

Having thus described the invention, what is claimed and desired secured by Letters Patent is:

1. An electrode holder comprising: a handle member; an electric contact member within said handle member; means for securing the extremity of an electric cable to said contact member; electrode gripping means hinged on the extremity of said handle member so that it may swing from an extended position in alignment with said handle member to a folded position alongside said handle member; and switch means projecting from said gripping means so as to close a circuit with said contact member when said gripping means are in the extended position and to break said contact when in the folded position.

2. An electrode holder comprising: a handle member; an electric contact member within said handle member; means for securing the extremity of an electric cable to said contact member; a hinge on the extremity of said handle member positioned to one side of the axis thereof; an electrode gripping member hingedly mounted on said hinge so that it may swing from an extended position in alignment with said handle member to a folded position to the side of said handle member; a switch blade formed on said gripping member adjacent said hinge so that it will extend within the extremity of said handle when in the extended position; and switch means formed on said contact member within said handle so placed as to be contacted by said switch blade as it enters said handle.

3. An electrode holder comprising: a first jaw member; a second jaw member hingedly mounted on said first jaw member; a spring forcing said second jaw member toward said first jaw member to clamp an electrode therebetween; a hinge on the rearward extremity of said first jaw member; a tubular handle member attached to said hinge; a contact member within said handle member; switch means projecting from said first jaw member into the extremity of said handle member into contact with said contact member so that as said jaw members are swung to the side of said handle member on said hinge said switch means will withdraw from said handle member and break contact with said contact member; and means for connecting said contact member to an electric cable.

CHARLES B. JANDOS.